(12) United States Patent
Lee et al.

(10) Patent No.: US 11,787,971 B2
(45) Date of Patent: Oct. 17, 2023

(54) POLARIZING PLATE, IMAGE DISPLAY DEVICE COMPRISING SAME AND PHOTOCURABLE COMPOSITION FOR POLARIZING PLATE PROTECTION LAYER

(71) Applicant: SHANJIN OPTOELECTRONICS (SUZHOU) CO., LTD., Zhangjiagang (CN)

(72) Inventors: Mi So Lee, Daejeon (KR); Sanghun Han, Daejeon (KR); Yoonkyung Kwon, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 271 days.

(21) Appl. No.: 16/766,141

(22) PCT Filed: Nov. 23, 2018

(86) PCT No.: PCT/KR2018/014497
§ 371 (c)(1),
(2) Date: May 21, 2020

(87) PCT Pub. No.: WO2019/103514
PCT Pub. Date: May 31, 2019

(65) Prior Publication Data
US 2020/0362194 A1    Nov. 19, 2020

(30) Foreign Application Priority Data
Nov. 24, 2017   (KR) .................. 10-2017-0158714

(51) Int. Cl.
C09D 163/00    (2006.01)
G02B 1/14      (2015.01)
C09D 7/40      (2018.01)

(52) U.S. Cl.
CPC ............. *C09D 163/00* (2013.01); *C09D 7/40* (2018.01); *G02B 1/14* (2015.01)

(58) Field of Classification Search
CPC .. G02B 1/111; G02B 1/14; G02B 1/12; G02B 5/305; C08J 7/046; C08J 5/18;
(Continued)

(56) References Cited

U.S. PATENT DOCUMENTS 9,250,371 B2 *   2/2016   Won ...................... G02B 5/3016
9,773,997 B2 *   9/2017   Kim ........................ C09J 133/06
(Continued)

FOREIGN PATENT DOCUMENTS

CN   101937113 A   1/2011
CN   102193130 A   9/2011
(Continued)

OTHER PUBLICATIONS

PCT KR2018014497 written search report translation (Year: 2018).*
International Search Report from Application No. PCT/KR2018/014497 dated Feb. 27, 2019, 2 pages.

*Primary Examiner* — Tamra L. Dicus
(74) *Attorney, Agent, or Firm* — Schmeiser, Olsen & Watts, LLP

(57) ABSTRACT

A polarizing plate, an image display device comprising the same, and a photocurable composition for a polarizing plate protective layer are provided. The polarizing plate includes a polarizer; and a protective layer in contact with at least one surface of the polarizer. The protective layer is a cured material of a photocurable composition for a polarizing plate protective layer including a photopolymerizable compound, and a photocation polymerization initiator. The photopolymerizable compound includes a first epoxy-based compound, a second epoxy-based compound and an oxetane compound.

8 Claims, 1 Drawing Sheet

(58) Field of Classification Search
CPC .... C08J 7/042; C08J 2367/02; C08J 2367/03; C08J 2435/02; C08J 2475/06; C08J 2483/04; C08F 283/006; C08G 18/673; C08G 18/7621; C08G 77/045; C08K 7/22; C08K 3/36; C08K 7/26; C08K 2201/011; C08L 25/14; C08L 51/08; C09D 133/08; B82Y 30/00
See application file for complete search history.

(56) References Cited

U.S. PATENT DOCUMENTS

| | | |
|---|---|---|
| 2008/0239211 A1 | 10/2008 | Suzuki et al. |
| 2010/0304284 A1 | 12/2010 | Rinker |
| 2011/0195249 A1 | 8/2011 | Song et al. |
| 2014/0071379 A1* | 3/2014 | Takahashi ......... G02F 1/134363 349/62 |
| 2016/0003983 A1 | 1/2016 | Park et al. |
| 2016/0062012 A1* | 3/2016 | Shin ................. G02B 5/3033 428/1.31 |
| 2016/0077239 A1* | 3/2016 | Asahi ................. G02B 1/118 359/601 |
| 2019/0004214 A1* | 1/2019 | Kim ...................... C09D 7/65 |
| 2020/0241173 A1* | 7/2020 | Byun ................... G02B 1/115 |
| 2020/0348450 A1* | 11/2020 | Byun ..................... G02B 1/12 |
| 2021/0206935 A1* | 7/2021 | Byun ................ B29D 11/00644 |
| 2021/0223438 A1* | 7/2021 | Baek ........................ G02B 1/14 |
| 2021/0309863 A1* | 10/2021 | Byun ....................... C09D 7/70 |

FOREIGN PATENT DOCUMENTS

| | | | |
|---|---|---|---|
| CN | 102778717 A | | 11/2012 |
| JP | 2008249896 A | | 10/2008 |
| JP | 2010507696 A | | 3/2010 |
| JP | 2011028234 A | | 2/2011 |
| JP | 2012014148 A | | 1/2012 |
| JP | 2013142863 A | | 7/2013 |
| KR | 20100030586 A | | 3/2010 |
| KR | 10-20016-003781 | * | 11/2010 |
| KR | 20110079573 A | | 7/2011 |
| KR | 20140084613 A | | 7/2014 |
| KR | 20150037491 A | | 4/2015 |
| KR | 20150071019 A | * | 6/2015 |
| KR | 20160001501 A | | 1/2016 |
| KR | 20160037145 A | | 4/2016 |
| KR | 20160037811 A | | 4/2016 |
| KR | 20160095822 A | | 8/2016 |
| KR | 20160142546 A | | 12/2016 |
| KR | 20170092928 A | | 8/2017 |
| KR | 20170092928 A | * | 8/2017 |
| WO | 2016158522 A1 | | 10/2016 |

* cited by examiner

[FIG. 1]
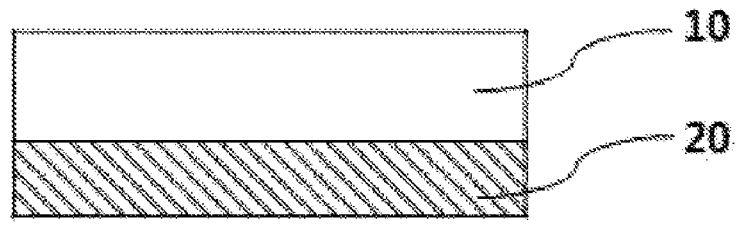
[FIG. 2]
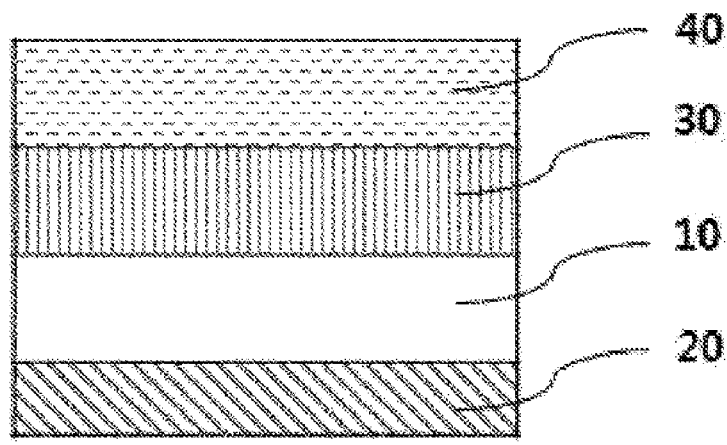
[FIG. 3]
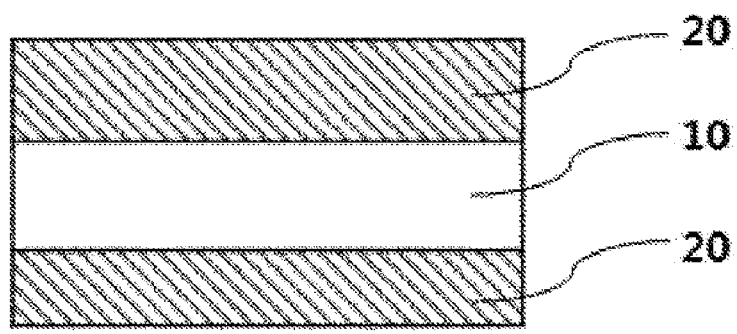

POLARIZING PLATE, IMAGE DISPLAY DEVICE COMPRISING SAME AND PHOTOCURABLE COMPOSITION FOR POLARIZING PLATE PROTECTION LAYER

CROSS-REFERENCE TO RELATED APPLICATIONS

The present application is a national stage entry under 35 U.S.C. § 371 of International Application No. PCT/KR2018/014497 filed on Nov. 23, 2018, which claims priority to Korean Patent Application No. 10-2017-0158714, filed with the Korean Intellectual Property Office on Nov. 24, 2017, the entire contents of which are incorporated herein by reference.

TECHNICAL FIELD

The present specification relates to a polarizing plate, an image display device comprising the same, and a photocurable composition for a polarizing plate protective layer.

BACKGROUND ART

Existing polarizing plates for a liquid crystal display device use a general polyvinyl alcohol (PVA)-based polarizer, and have a constitution of attaching a protective film such as polyethylene terephthalate (PET) on at least one side surface of the polarizer.

Recently, demands for low light leakage and thinning of polarizing plates have increased, and in order to satisfy these properties, a method of directly forming a protective layer on a polarizer has been examined instead of using an existing protective base formed as a film in advance.

However, when directly forming a protective layer on an existing polyvinyl alcohol-based elongation-type polyvinyl alcohol-based polarizer, a problem of the polarizer being torn by stress generated from polarizer shrinkage at a high temperature has been difficult to resolve compared to when using a protective substrate on both surfaces as in the art.

DISCLOSURE

Technical Problem

The present specification is directed to providing a polarizing plate, an image display device comprising the same, and a photocurable composition for a polarizing plate protective layer.

Technical Solution

One embodiment of the present specification provides a polarizing plate comprising a polarizer; and a protective layer in contact with at least one surface of the polarizer, wherein the protective layer is a cured material of a photocurable composition for a polarizing plate protective layer comprising a photopolymerizable compound consisting of a first epoxy-based compound, a second epoxy-based compound and an oxetane compound; and a photocation polymerization initiator, the first epoxy-based compound is included in 50 parts by weight to 80 parts by weight with respect to a total 100 parts by weight of the photopolymerizable compound, the photocation polymerization initiator comprises a short wavelength initiator and a long wavelength initiator, and the short wavelength initiator is included in 2 parts by weight to 2.5 parts by weight and the long wavelength initiator is included in 0.8 parts by weight to 1.5 parts by weight with respect to a total 100 parts by weight of the photocurable composition for a polarizing plate protective layer.

Another embodiment of the present specification provides an image display device comprising the polarizing plate.

Still another embodiment of the present specification provides a photocurable composition for a polarizing plate protective layer comprising a photopolymerizable compound consisting of a first epoxy-based compound, a second epoxy-based compound and an oxetane compound; and a photocation polymerization initiator, wherein the first epoxy-based compound is included in 50 parts by weight to 80 parts by weight with respect to a total 100 parts by weight of the photopolymerizable compound, the photocation polymerization initiator comprises a short wavelength initiator and a long wavelength initiator, and the short wavelength initiator is included in 2 parts by weight to 2.5 parts by weight and the long wavelength initiator is included in 0.8 parts by weight to 1.5 parts by weight with respect to a total 100 parts by weight of the photocurable composition for a polarizing plate protective layer.

Advantageous Effects

A polarizing plate according to one embodiment of the present specification is capable of replacing an existing base layer required to have an adhesive layer provided in between with one protective layer, and is thereby capable of minimizing costs and processes while thinning and weight lightening the polarizing plate.

A polarizing plate according to one embodiment of the present specification is capable of reducing a blocking phenomenon with PET, a carrier film, when preparing a cation-based protective layer, and therefore, is readily stored for a long period of time while a carrier film, a protective base of the protective layer, is attached.

A protective layer of a polarizing plate according to one embodiment of the present specification has high storage modulus and is thereby capable of suppressing a shrinkage or expansion phenomenon at a high temperature, and therefore, is capable of preventing tearing of a polarizer and the polarizing plate.

A polarizing plate according to one embodiment of the present specification has an advantage of having high durability even when a separate protective film is not included on a protective layer.

DESCRIPTION OF DRAWINGS

FIG. 1 illustrates a polarizing plate according to one embodiment of the present specification.

FIG. 2 illustrates a polarizing plate according to another embodiment of the present specification.

FIG. 3 illustrates a polarizing plate according to still another embodiment of the present specification.

REFERENCE NUMERAL

10: Polarizer
20: Protective Layer
30: Adhesive Layer
40: Protective Film

MODE FOR DISCLOSURE

Hereinafter, the present specification will be described in more detail.

In the present specification, a description of a certain part "comprising" certain constituents means capable of further comprising other constituents, and does not exclude other constituents unless particularly stated on the contrary.

In the present specification, a description of a certain member being placed "on" another member comprises not only a case of the one member adjoining the other member but a case of still another member being present between the two members.

When directly forming a protective layer on an existing polyvinyl alcohol-based elongation-type polyvinyl alcohol-based polarizer, a problem of the polarizer being torn by stress generated from polarizer shrinkage at a high temperature has been difficult to resolve compared to when using a protective substrate on both surfaces as in the art.

Accordingly, in order to directly form a protective layer on a polarizer, properties at a level capable of withstanding stress caused by polarizer shrinkage at a high temperature are required. As the protective layer satisfying such properties, a UV-curable cation-based coating layer is normally used, and such a cation-based coating layer has a problem in that long-term storage is difficult due to an occurrence of a blocking phenomenon with PET, a carrier film, during manufacturing.

Specifically, a polarizing plate manufactured in a roll process is attached to a panel after removing a carrier film from a laminate of "carrier film/protective layer/polarizer (PVA)/adhesive layer/protective film", and forming a gluing layer on the protective layer. In the process of removing a carrier film, blocking occurs between the protective layer and the carrier film, and this causes damages on the protective layer declining an appearance and optical properties of the polarizing plate.

However, a polarizing plate according to one embodiment of the present specification comprises a short wavelength initiator and a long wavelength initiator in a cured material of a photocurable composition for a polarizing plate protective layer, a protective layer, in specific content ranges. By minimizing a content of OH generated in an epoxy ring-opening reaction, the short wavelength initiator and short wavelength initiator may suppress OH and COOH remaining on the surface during a PET preparation process forming chemical covalent bonds or hydrogen bonds with an epoxy-based compound of the protective layer. Accordingly, as well as preventing a blocking phenomenon with PET, a carrier film, the polarizing plate according to one embodiment of the present specification may prevent tearing of the carrier PET film. In addition, the polarizing plate according to one embodiment of the present specification is readily stored for a long period of time while a carrier film, a protective base of a protective layer, is attached.

In addition, the polarizing plate according to one embodiment of the present specification has an advantage of having high durability even when a separate protective film is not included on a protective layer as well as enhancing high temperature durability by enhancing toughness.

In addition, the polarizing plate according to one embodiment of the present specification is readily stored for a long period of time while a carrier film, a protective base of a protective layer, is attached.

FIG. 1 illustrates a polarizing plate according to one embodiment of the present specification. FIG. 1 illustrates a structure of a polarizing plate in which a protective layer (20) is provided on one surface of a polarizer (10).

In addition, FIG. 3 illustrates a polarizing plate according to still another embodiment of the present specification. FIG. 3 illustrates a structure of a polarizing plate in which a protective layer (20) is provided on both surfaces of a polarizer (10). As in FIG. 3, providing a protective layer on both surfaces of a polarizer has an advantage in that thinning is obtained with almost no phase difference.

One embodiment of the present specification provides a polarizing plate comprising a polarizer; and a protective layer in contact with at least one surface of the polarizer, wherein the protective layer is a cured material of a photocurable composition for a polarizing plate protective layer comprising a photopolymerizable compound consisting of a first epoxy-based compound, a second epoxy-based compound and an oxetane compound; and a photocation polymerization initiator, the first epoxy-based compound is included in 50 parts by weight to 80 parts by weight with respect to a total 100 parts by weight of the photopolymerizable compound, the photocation polymerization initiator comprises a short wavelength initiator and a long wavelength initiator, and the short wavelength initiator is included in 2 parts by weight to 2.5 parts by weight and the long wavelength initiator is included in 0.8 parts by weight to 1.5 parts by weight with respect to a total 100 parts by weight of the photocurable composition for a polarizing plate protective layer.

In one embodiment of the present specification, the first epoxy-based compound and the second epoxy-based compound are different from each other.

In the present specification, as the polarizer, polarizers well known in the art, for example, films formed with polyvinyl alcohol (PVA) comprising iodine or a dichroic dye may be used. The polarizer may be prepared by dyeing a polyvinyl alcohol-based film with iodine or a dichroic dye, however, the preparation method is not particularly limited. In the present specification, the polarizer means a state not comprising a protective layer (or protective film), and the polarizing plate means a state comprising a polarizer and a protective layer (or protective film).

The polarizing plate is prepared through a process of monoaxially elongating a polyvinyl alcohol-based resin film, a process of dyeing the polyvinyl alcohol-based resin film with a dichroic dye and adsorbing the dichroic dye, a process of treating the dichroic dye-adsorbed polyvinyl alcohol-based resin film with an aqueous boric acid solution, a process of washing after the treatment by an aqueous boric acid solution, and a process of bonding a protective layer on the monoaxially elongated polyvinyl alcohol-based resin film to which a dichroic dye is adsorption oriented through these processes.

Monoaxial elongation may be performed before the dyeing by a dichroic dye, may be performed simultaneously with the dyeing by a dichroic dye, or may be performed after the dyeing by a dichroic dye. When monoaxial elongation is preferred after the dyeing by a dichroic dye, this monoaxial elongation may be performed before the boric acid treatment or during the boric acid treatment. In addition, monoaxial elongation may be performed in a plurality of these steps. In order to perform monoaxial elongation, the film may be monoaxially elongated between two rolls having a different moving speed, or may be monoaxially elongated using a heat roll. In addition, the elongation may be dry elongation performing elongation in the air, or may be wet elongation performing elongation while being swollen by a solvent. The elongation ratio is not particularly limited, but is commonly from 4 times to 8 times.

Meanwhile, the polarizer preferably has a thickness of 5 μm to 40 μm and more preferably 5 μm to 25 μm. When the polarizer thickness is smaller than the above-mentioned numerical range, optical properties may decline, and when the thickness of larger than the above-mentioned numerical range, the degree of polarizer shrinkage at a low temperature (for example, −30° C.) increases, which may weaken overall heat-related durability of the polarizing plate.

In addition, when the polarizer is a polyvinyl alcohol-based film, the polyvinyl alcohol-based film is not particularly limited in the use as long as it comprises a polyvinyl alcohol resin or derivatives thereof. Herein, the derivatives of the polyvinyl alcohol resin may comprise, but are not limited to, a polyvinyl formal resin, a polyvinyl acetal resin and the like. In addition, commercially-available polyvinyl alcohol-based films such as P30, PE30 or PE60 of Kuraray Co. Ltd., and M2000, M3000 or M6000 of Nippon Gohsei Co., Ltd. may also be used, however, the polyvinyl alcohol-based film is not limited thereto.

The polyvinyl alcohol-based film preferably has a degree of polymerization of 1,000 to 10,000, and more preferably 1,500 to 5,000. When the degree of polymerization satisfies the above-mentioned numerical range, molecular movements are free, and mixing with iodine, a dichroic dye or the like may be flexible.

The protective layer of the polarizing plate according to one embodiment of the present specification is formed by being directly coated on the polarizer. Being directly coated on the polarizer means the polarizer and the protective layer being physically in contact with each other without providing an adhesive layer in between. In other words, by the protective layer according to one embodiment of the present specification being directly formed on the polarizer without a separate adhesive layer, a thin polarizing plate may be provided. In addition, since the protective layer of the polarizing plate according to one embodiment of the present specification effectively suppresses a shrinkage or expansion phenomenon of the polarizer at a high temperature without a separate protective film, tearing of the polarizer and the polarizing plate may be prevented.

In addition, the protective layer of the polarizing plate according to one embodiment of the present specification is preferably formed with a photocurable composition. When the protective layer is a curable resin layer formed from a photocurable composition as above, there are advantages in that the preparation method is simple, and furthermore, adhesion between the protective layer and the polarizer is excellent. In addition, durability of the polarizing plate may be further improved.

Meanwhile, the photocurable composition for a polarizing plate protective layer according to one embodiment of the present specification preferably has a glass transition temperature of higher than or equal to 90° C. and lower than or equal to 130° C. after curing, and the glass transition temperature may be from 100° C. to 130° C. When having a glass transition temperature as in the above-mentioned numerical range, a protective layer having excellent durability even under a high temperature environment may be obtained.

In the present specification, the glass transition temperature is measured through a dynamic mechanical analysis (DMA) after coating on a release film (for example, polyethylene terephthalate film) to a thickness of 50 μm, curing the result by irradiating ultraviolet rays under a condition of light intensity being 1000 mJ/cm$^2$ or greater, then removing the release film, and laser cutting the specimen to a certain size. Herein, the glass transition temperature is identified through inflection of storage modulus when constantly tensioning with 10% strain while, as the measurement temperature, raising the temperature up to 160° C. from a starting temperature of −10° C. at a temperature raising rate of 5° C./min.

Meanwhile, a method for forming the protective layer is not particularly limited, and the protective layer may be formed using methods well known in the art. For example, the protective layer may be formed using a method of forming a barrier layer through coating the photocurable composition for a polarizing plate protective layer on at least one surface of the polarizer using a coating method well known in the art such as a method of spin coating, bar coating, roll coating, gravure coating or blade coating, and then irradiating ultraviolet rays, which is irradiation light, using an ultraviolet irradiator.

Alternatively, the protective layer may also be formed by coating the photocurable composition for a polarizing plate protective layer on at least one surface of the polarizer, and then curing the result using an ultraviolet irradiator, however, the method is not limited thereto.

The ultraviolet wavelength is preferably from 100 nm to 400 nm and more preferably from 320 nm to 400 nm. In addition, the light intensity of the irradiation light is preferably from 100 mJ/cm$^2$ to 1000 mJ/cm$^2$ and more preferably from 500 mJ/cm$^2$ to 1000 mJ/cm$^2$.

The irradiation time of the irradiation light is preferably from 1 second to 10 minutes and more preferably from 2 seconds to 30 seconds. Satisfying the above-mentioned irradiation time range has an advantage of minimizing running wrinkle occurrences on the polarizer by preventing the excessive transfer of heat from a light source.

In the present specification, the photocation polymerization initiator initiates a polymerization reaction of an epoxy group or an oxetanyl group by generating cations or Lewis acids through irradiating active energy rays such as visible rays, ultraviolet rays, X-rays or an electron beam, and may be divided into a short wavelength initiator and a long wavelength initiator.

In the present specification, the short wavelength initiator is an iodine-based compound absorbing a wavelength of 310 nm or lower. Specifically, the short wavelength initiator means an iodine-based compound activated by absorbing a wavelength of 310 nm or lower, and generating cations or Lewis acids by irradiating active energy. Examples thereof may comprise diphenyl iodonium hexafluorophosphate (Iod-PF6), diphenyl iodonium triflate (Iod-OSO$_2$CF$_3$), diphenyl iodonium p-toluene sulfonate (Iod-OSO$_2$PhCH$_3$), diphenyl iodonium chloride (Iod-Cl), [4-methylphenyl-(4-(2-methylpropyl)phenyl)] iodonium hexafluorophosphate (Irgacure 250) and the like, and [4-methylphenyl-(4-(2-methylpropyl)phenyl)] iodonium hexafluorophosphate (Irgacure 250) is preferred, however, the short wavelength initiator is not limited thereto.

In the present specification, the long wavelength initiator is a thioxanthone-based compound absorbing a wavelength of 350 nm or higher. The long wavelength initiator means a thioxanthone-based compound activated by absorbing a wavelength of 350 nm or higher, and generating cations or Lewis acids by irradiating active energy. Examples thereof may comprise isopropyl-thioxanthone (ITX), 1-chloro-2-propoxy-thioxanthone (CPTX), 2-chloro-thioxanthone (CTX), 2,4-diethyl-thioxanthone (DETX), and mixtures thereof, and isopropyl-thioxanthone (ITX) is preferred, however, the long wavelength initiator is not limited thereto.

In one embodiment of the present specification, the short wavelength initiator is included in 2 parts by weight to 2.5 parts by weight and the long wavelength initiator is included in 0.8 parts by weight to 1.5 parts by weight with respect to a total 100 parts by weight of the photocurable composition for a polarizing plate protective layer.

When the photocation polymerization initiator is included in the above-mentioned numerical content range, ultraviolet rays may effectively reach inside the protective layer, the polarization rate is also excellent, and the produced polymer may be prevented from its molecular weight being reduced. Accordingly, an advantage of excellent cohesion of the formed protective layer is obtained. Particularly, when the short wavelength initiator and the long wavelength initiator are included in the above-mentioned numerical content ranges, the protective layer has excellent cohesion, and, as well as preventing a blocking phenomenon with PET, a carrier film, tearing of the carrier PET film may be prevented.

In one embodiment of the present specification, the short wavelength initiator may be included in 2 parts by weight to 2.5 parts by weight, and more preferably in 2 parts by weight to 2.3 parts by weight with respect to a total 100 parts by weight of the photocurable composition for a polarizing plate protective layer. When satisfying the numerical range, the short wavelength initiator content is properly adjusted, and high temperature durability of the protective layer may be enhanced.

In addition, by comprising the short wavelength initiator and the long wavelength initiator in specific ranges, the photocurable composition is effective in significantly enhancing storage modulus of the protective layer and enhancing high temperature durability.

In one embodiment of the present specification, the first epoxy-based compound is an alicyclic epoxy-based compound.

Specifically, the alicyclic epoxy-based compound means an epoxy-based compound in which an epoxy group is formed between two adjacent carbon atoms forming an aliphatic hydrocarbon ring. Examples thereof may comprise 2-(3,4-epoxy)cyclohexyl-5,5-spiro-(3,4-epoxy)cyclohexane-m-dioxane, 3,4-epoxycyclohexylmethyl-3,4-epoxycyclohexane carboxylate, 3,4-epoxy-6-methylcyclohexylmethyl-3,4-epoxy-6-methylcyclohexane carboxylate, vinylcyclohexane dioxide, bis(3,4-epoxycyclohexylmethyl) adipate, bis(3,4-epoxy-6-methylcyclohexylmethyl)adipate, exo-exo bis(2,3-epoxycyclopentyl)ether, endo-exo bis(2,3-epoxycyclopentyl)ether, 2,2-bis[4-(2,3-epoxypropoxy)cyclohexyl]propane, 2,6-bis(2,3-epoxypropoxycyclohexyl-p-dioxane), 2,6-bis(2,3-epoxypropoxy)norbornene, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy)cyclopentylphenyl-2,3-epoxypropyl ether, 1-(2,3-epoxypropoxy)phenyl-5,6-epoxyhexahydro-4,7-methanoindane, o-(2,3-epoxy)cyclopentylphenyl-2,3-epoxypropyl ether, 1,2-bis[5-(1,2-epoxy)-4,7-hexahydromethanoindanoxyl]ethanecyclopentenyl phenyl glycidyl ether, methylenebis(3,4-epoxycyclohexane)ethylene glycol di(3,4-epoxycyclohexylmethyl) ether, ethylenebis(3,4-epoxycyclohexane carboxylate), s-caprolactone adducts of 3,4-epoxycyclohexane methanol, ester compounds of multivalent (3 to 20) alcohols, and the like, and particularly, 3,4-epoxycyclohexylmethyl-3,4-epoxycyclohexane carboxylate is preferred, however, the alicyclic epoxy-based compound is not limited thereto.

In one embodiment of the present specification, the first epoxy-based compound is preferably included in 50 parts by weight to 80 parts by weight with respect to a total 100 parts by weight of the photopolymerizable compound.

When comprising the first epoxy-based compound in the above-mentioned numerical content range, the composition may be effectively cured during photocuring, and high glass transition temperature and storage modulus may be maintained after the curing resulting in an advantage of excellent durability.

In one embodiment of the present specification, the second epoxy-based compound is an aliphatic epoxy-based compound.

Specifically, the aliphatic epoxy-based compound means an epoxy-based compound comprising an aliphatic chain or an aliphatic ring in the molecule. Examples thereof may comprise 1,4-cyclohexane dimethanol diglycidyl ether, 1,4-butanediol diglycidyl ether, 1,6-hexanediol diglycidyl ether, neopentyl diglycidyl ether, resorcinol diglycidyl ether, diethylene glycol diglycidyl ether, ethylene glycol diglycidyl ether, trimethylol propane triglycidyl ether, n-butyl glycidyl ether, 2-ethylhexyl glycidyl ether and the like, and particularly, using 1,4-cyclohexane dimethanol diglycidyl ether and neopentyl diglycidyl ether is preferred, however, the aliphatic epoxy-based compound is not limited thereto. In addition, the second epoxy-based compound may be one, or two or more types of compounds selected from among the aliphatic epoxy-based compounds.

In one embodiment of the present specification, the second epoxy-based compound is preferably included in 1 parts by weight to 30 parts by weight with respect to a total 100 parts by weight of the photopolymerizable compound.

When comprising the second epoxy-based compound in the above-mentioned numerical content range, the composition may be effectively cured during photocuring, and high glass transition temperature and storage modulus may be maintained after the curing resulting in an advantage of excellent durability.

In one embodiment of the present specification, types of the oxetane compound are not particularly limited, and oxetane compounds known in the art may be used. Examples thereof may comprise 3-ethyl-3-[(3-ethyloxetan-3-yl)methoxymethyl]oxetane, 1,4-bis[(3-ethyloxetan-3-yl)methoxymethyl]benzene, 1,4-bis[(3-ethyloxetan-3-yl)methoxy]benzene, 1,3-bis[(3-ethyloxetan-3-yl)methoxy]benzene, 1,2-bis[(3-ethyloxetan-3-yl)methoxy]benzene, 4,4'-bis[(3-ethyloxetan-3-yl)methoxy]biphenyl, 2,2'-bis[(3-ethyloxetan-3-yl)methoxy]biphenyl, 3,3',5,5'-tetramethyl-4,4'-bis[(3-ethyloxetan-3-yl)methoxy]biphenyl, 2,7-bis[(3-ethyloxetan-3-yl)methoxy]naphthalene, bis[4-{(3-ethyloxetan-3-yl)methoxy}phenyl]methane, bis[2-{(3-ethyloxetan-3-yl)methoxy}phenyl]methane, 2,2-bis[4-{(3-ethyloxetan-3-yl)methoxy}phenyl]propane, an etherified denatured product of a novolac-type phenol-formaldehyde resin by 3-chloromethyl-3-ethyloxetane, 3(4),8(9)-bis[(3-ethyloxetan-3-yl)methoxymethyl]-tricyclo[5.2.1.0 2,6]decane, 2,3-bis[(3-ethyloxetan-3-yl)methoxymethyl]norbornane, 1,1,1-tris[(3-ethyloxetan-3-yl)methoxymethyl]propane, 1-butoxy-2,2-bis[(3-ethyloxetan-3-yl)methoxymethyl]butane, 1,2-bis[{2-(3-ethyloxetan-3-yl)methoxy}ethylthio]ethane, bis[{4-(3-ethyloxetan-3-yl)methylthio}phenyl]sulfide, 1,6-bis[(3-ethyloxetan-3-yl)methoxy]-2,2,3,3,4,4,5,5-octafluorohexane and the like, but are not limited thereto.

In one embodiment of the present specification, the oxetane compound is preferably included in 10 parts by weight to 30 parts by weight and more preferably included in 20 parts by weight to 30 parts by weight with respect to a total 100 parts by weight of the photopolymerizable compound.

The oxetane compound being included in the above-mentioned numerical content range has an advantage of maintaining high glass transition temperature and storage modulus after curing the photocurable composition. In addition, a protective layer having a uniform thickness may be formed by maintaining constant viscosity.

According to one embodiment of the present specification, the photocurable composition for a polarizing plate protective layer may further comprise one or more of a dye, a pigment, an epoxy resin, an ultraviolet stabilizer, an antioxidant, a colorant, a reinforcing agent, a filler, a defoamer, a surfactant and a plasticizer as necessary.

According to one embodiment of the present specification, the photocurable composition for a polarizing plate protective layer may further comprise a radical initiator.

The radical initiator according to one embodiment of the present specification is for enhancing a curing rate by facilitating radical polymerization, and as the radical initiator, radical initiators generally used in the art may be used without limit.

Examples of the radical initiator may comprise 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoyl formate, oxy-phenyl-acetic acid-2-[2 oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone), diphenyl (2,4,6-trimethylbenzoyl)-phosphine oxide, phosphine oxide, phenylbis(2,4,6-trimethylbenzoyl)-phosphine oxide and the like. Using one, or two or more types of the above-mentioned examples is preferred in the present specification, however, the use is not limited thereto.

In one embodiment of the present specification, the protective layer preferably has a thickness of 5 μm to 10 μm and more preferably 6 μm to 8 μm.

The thickness of the protective layer being less than the above-mentioned numerical range may cause concern of decreasing protective layer strength or high temperature durability and producing cracks, and the thickness being greater than the above-mentioned numerical range is not proper in terms of thinning of the polarizing plate.

In one embodiment of the present specification, the photocurable composition for a polarizing plate protective layer preferably has viscosity of greater than or equal to 50 cps and less than or equal to 200 cps at 25° C., and more preferably greater than or equal to 50 cps and less than or equal to 130 cps at 25° C.

When the viscosity of the photocurable composition for a polarizing plate protective layer satisfies the above-mentioned numerical range, the protective layer may be formed to be thin, and an advantage of excellent workability is obtained.

In one embodiment of the present specification, the protective layer preferably has storage modulus of 1,500 MPa to 10,000 MPa, more preferably 1,800 MPa to 8,000 MPa and most preferably 2,000 MPa to 7,000 MPa at 80° C.

When storage modulus of the protective layer satisfies the above-mentioned numerical range, stress applied to the polarizer is effectively suppressed, which is effective in effectively suppressing crack occurrences on the polarizer caused by polarizer shrinkage or expansion under a high temperature or high humidity environment. In addition, adhesive strength for the polarizer is enhanced. As a result, by suppressing shrinkage and expansion of the polarizing plate at a high temperature, occurrences of light leakage may be prevented as well as obtaining excellent adhesive strength when using the polarizing plate in a liquid crystal panel and the like.

Another embodiment of the present specification provides a polarizing plate further comprising a carrier film on a surface opposite to the surface in contact with the polarizer of the protective layer.

In the present specification, the carrier film means a film for a process for protecting a protective layer in a polarizing plate manufacturing process. Specifically, a polarizing plate manufactured in a roll process is attached to a panel after removing a carrier film from a laminate of "carrier film/protective layer/polarizer (PVA)/adhesive layer/protective film" and forming an adhesive layer on the protective layer, and the carrier film is a film for a process used in this process. The carrier film is not particularly limited as long as it is readily peeled off in a polarizing plate manufacturing process. Examples thereof may comprise polyethylene terephthalate (PET), a cycloolefin polymer, polycarbonate or triacetyl cellulose. When using a carrier film as above, the carrier film effectively protects a polarizer when forming a protective layer preventing contamination of other components from being contaminated by a composition for forming a protective layer, and the carrier film absorbs a pressure applied by pressuring means, which is effective in effectively suppressing breakage or pressing by relaxing stressed applied to the polarizer.

In one embodiment of the present specification, the adhesive layer may have storage modulus of greater than or equal to 100 MPa and less than or equal to 1,800 MPa, preferably greater than or equal to 300 MPa and less than or equal to 1,500 MPa, and more preferably greater than or equal to 500 MPa and less than or equal to 1,200 MPa at 80° C. When satisfying the above-mentioned range, adhesive strength by the adhesive layer increases, which is effective in making protective film peel off difficult.

Storage modulus of the adhesive layer is measured through DMA after coating a photocurable composition having the same composition as the adhesive layer on a release film (for example, polyethylene terephthalate film) to a thickness of 50 μm, curing the result by irradiating ultraviolet rays under a condition of light intensity being 1000 mJ/cm$^2$ or greater, then removing the release film, and laser cutting the specimen to a certain size. Herein, storage modulus when constantly tensioning with 10% strain while, as the measurement temperature, raising the temperature up to 160° C. from a starting temperature of −30° C. at a temperature raising rate of 5° C./min is measured, and a storage modulus value at 80° C. is recorded.

One embodiment of the present specification provides a polarizing plate having a protective film attached on a surface opposite to the surface in contact with the protective layer of the polarizer using an adhesive layer as a medium.

Specifically, when the protective layer is formed on one surface of the polarizer in the polarizing plate according to one embodiment of the present specification, a separate transparent protective film may be attached on a surface opposite to the protective layer-formed surface using an adhesive layer as a medium in order to support and protect the polarizer.

Herein, the protective film is for supporting and protecting the polarizer, and protective films made of various materials generally known in the art such as a polyethylene terephthalate (PET) film, a cycloolefin polymer (COP) film, or an acryl-based film such as tri-acetyl cellulose (TAC) may be used. Considering optical properties, durability, economic feasibility and the like, using a polyethylene terephthalate film is particularly preferred among these.

Meanwhile, attaching the polarizer and the protective film may be carried out using a method of, after coating an adhesive composition for a polarizing plate on the surface of the polarizer or the protective film using a roll coater, a gravure coater, a bar coater, a knife coater, a capillary coater or the like, heating and laminating these using a laminating roll, laminating through room temperature pressing, irradiating UV after lamination, or the like.

FIG. 2 illustrates a polarizing plate according to another embodiment of the present specification. In FIG. 2, a structure of a polarizing plate in which a protective layer (20) is provided on one surface of a polarizer (10), an adhesive layer (30) is provided on a surface opposite to the surface in contact with the protective layer of the polarizer, and a protective film (40) is provided on the adhesive layer is illustrated.

In one embodiment of the present specification, the adhesive layer is a cured material of an adhesive composition, and the adhesive composition comprises an epoxy compound and an oxetane compound.

The adhesive layer is preferably formed with a photocurable adhesive composition. A curable resin layer in which the adhesive layer is formed with a photocurable composition as above has advantages in that the preparation method is simple, and furthermore, adhesion with the protective film is excellent. In addition, durability of the polarizing plate may be further improved.

As the epoxy compound, at least one or more of an alicyclic epoxy compound and a glycidyl ether-type epoxy compound may be used, and preferably, a mixture of an alicyclic epoxy compound and a glycidyl ether-type epoxy compound may also be used. The glycidyl ether-type epoxy compound means an epoxy compound comprising at least one or more glycidyl ether groups.

Examples of the epoxy compound may comprise 3,4-epoxycyclohexylmethyl-3,4-epoxycyclohexane carboxylate, bis(3,4-epoxycyclohexylmethyl)adipate, a caprolactone-modified compound of 3,4-epoxycyclohexylmethyl-3,4-epoxycyclohexane carboxylate, an ester compound or caprolactone-modified compound of polyvalent carboxylic acid and 3,4-epoxycyclohexylmethyl alcohol, a silicone-based compound having an alicyclic epoxy group at the end, diglycidyl ether of bisphenol A, diglycidyl ether of bisphenol F, diglycidyl ether of brominated bisphenol A, a phenol novolac-type epoxy resin, a cresol novolac-type epoxy resin, a biphenyl-type epoxy resin, terephthalic acid diglycidyl ester, phthalic acid diglycidyl ester, an addition reactant of end carboxylic acid polybutadiene and a bisphenol A-type epoxy resin, dicyclopentadiene dioxide, limonene dioxide, 4-vinylcyclohexene dioxide, polyethylene glycol diglycidyl ether, polypropylene glycol diglycidyl ether, polytetramethylene glycol diglycidyl ether, hydrogen-added bisphenol A diglycidyl ether, epoxylated vegetable oil, 2-(3,4-epoxycyclohexyl)ethyltrimethoxysilane, 2-(3,4-epoxycyclohexyl)ethyltriethoxysilane, 3-glycidoxypropyltrimethoxysilane, 3-glycidoxypropylmethyldimethoxysilane, polybutadiene diglycidyl ether of both end hydroxyl groups, an inner epoxide of polybutadiene, a compound in which double bonds of a styrene-butadiene copolymer are partly epoxylated (for example "Epofriend" manufactured by Daicel Corporation), a compound in which isoprene units of a block copolymer of an ethylene-butylene copolymer and polyisoprene are partly epoxylated (for example, "L-207" manufactured by KRATON Corporation) and the like, but are not limited thereto.

Examples of the glycidyl ether-type epoxy compound may comprise novolac epoxy, bisphenol A-based epoxy, bisphenol F-based epoxy, brominated bisphenol epoxy, n-butyl glycidyl ether, aliphatic glycidyl ether (12 to 14 carbon atoms), 2-ethylhexyl glycidyl ether, phenyl glycidyl ether, o-cresyl glycidyl ether, nonylphenyl glycidyl ether, ethylene glycol diglycidyl ether, diethylene glycol diglycidyl ether, propylene glycol diglycidyl ether, tripropylene glycol diglycidyl ether, neopentyl glycol diglycidyl ether, 1,4-butanediol diglycidyl ether, 1,6-hexanediol diglycidyl ether, trimethylolpropane triglycidyl ether, trimethylolpropane diglycidyl ether, trimethylolpropane polyglycidyl ether, polyethylene glycol diglycidyl ether or glycerin triglycidyl ether and the like. In addition, glycidyl ether having a ring-type aliphatic skeleton such as 1,4-cyclohexanedimethanol diglycidyl ether, a hydrogen-added compound of an aromatic epoxy compound and the like may be included as an example. Preferably, glycidyl ether having a ring-type aliphatic skeleton, and glycidyl ether having a ring-type aliphatic skeleton with preferably 3 to 20 carbon atoms, preferably 3 to 16 carbon atoms, and more preferably 3 to 12 carbon atoms may be used, however, the glycidyl ether-type epoxy compound is not limited thereto.

Meanwhile, when the alicyclic epoxy compound and the glycidyl ether-type epoxy compound are mixed, the weight ratio is preferably from 1:1 to 1:0.5.

According to one embodiment of the present specification, the alicyclic epoxy compound is preferably included in 30 parts by weight to 80 parts by weight and more preferably in 50 parts by weight to 70 parts by weight based on a total weight of the epoxy compound. Satisfying the above-mentioned numerical range has an advantage of effectively curing the composition during photocuring.

According to one embodiment of the present specification, the glycidyl ether-type epoxy compound is preferably included in 10 parts by weight to 60 parts by weight and more preferably in 30 parts by weight to 50 parts by weight based on a total weight of the epoxy compound.

In one embodiment of the present specification, the oxetane compound is a compound having 4-membered ring ether in the molecule, and examples thereof may comprise 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, phenol novolac oxetane and the like, but are not limited thereto. These oxetane compounds may be readily obtained as commercial products, and specific examples thereof may comprise ARON OXETANE OXT-101 (manufactured by TOAGOSEI Co., Ltd.), ARON OXETANE OXT-121 (manufactured by TOAGOSEI Co., Ltd.), ARON OXETANE OXT-211 (manufactured by TOAGOSEI Co., Ltd.), ARON OXETANE OXT-221 (manufactured by TOAGOSEI Co., Ltd.), ARON OXETANE OXT-212 (manufactured by TOAGOSEI Co., Ltd.) and the like.

According to one embodiment of the present specification, the epoxy compound is preferably included in 10 parts by weight to 50 parts by weight and more preferably included in 15 parts by weight to 40 parts by weight with respect to a total 100 parts by weight of the adhesive composition.

According to one embodiment of the present specification, the oxetane compound is preferably included in 10 parts by weight to 50 parts by weight and more preferably included in 15 parts by weight to 40 parts by weight with respect to a total 100 parts by weight of the adhesive composition.

According to one embodiment of the present specification, the adhesive composition may further comprise a photocation polymerization initiator or a radical initiator. Types of the photocation polymerization initiator or the radical initiator may be selected from among the examples of the photocation polymerization initiator and the radical initiator in the composition for a polarizing plate protective layer described above.

In addition, the adhesive composition of the present specification may further comprise a photosensitizer.

Examples of the photosensitizer may comprise carbonyl compounds, organosulfur compounds, persulfides, redox-based compounds, azo and diazo compounds, anthracene-based compounds, halogen compounds, photoreductive dyes and the like, but are not limited thereto.

In addition, the adhesive composition of the present specification may further comprise a silane coupling agent. When comprising a silane coupling agent, the silane coupling agent lowers surface energy of the adhesive obtaining an effect of enhancing adhesive wetting.

Herein, the silane coupling agent more preferably comprise a cation polymerizable functional group such as an epoxy group, a vinyl group or a radical group. In addition, using a silane coupling agent that does not comprises a cation polymerizable functional group is effective in improving wetting without lowering a glass transition temperature compared to a silane coupling agent that does not comprise a surfactant or a cation polymerizable functional group. This is due to the fact that the cation polymerization functional group of the silane coupling agent reduces a phenomenon of lowering a glass transition temperature of an adhesive layer after curing by forming a crosslinked form while reacting with a silane group of the adhesive composition.

Meanwhile, the adhesive layer may be formed using methods well known in the art. For example, an adhesive composition is coated on one surface of a polarizer or a protective film to form an adhesive layer, laminating the polarizer and the protective film, and then curing the result. Herein, the coating may be performed using coating methods well known in the art such as methods of spin coating, bar coating, roll coating, gravure coating or blade coating. In addition, after coating the adhesive composition, a separate drying process may be further included before the curing. The drying method is not limited as long as it is a method commonly used in the art.

One embodiment of the present specification provides an image display device comprising the polarizing plate.

In the present specification, the image display device may be a liquid crystal display device (LCD), a plasma display device (PDP) and an organic electroluminescent display device (OLED).

More specifically, the image display device may be a liquid crystal display comprising a liquid crystal panel and polarizing plates each provided on both surfaces of the liquid crystal panel, and herein, at least one of the polarizing plates may be the polarizing plate comprising the polarizer according to one embodiment of the present specification described above. In other words, the polarizing plate locally has, in a polarizing plate comprising a polyvinyl alcohol-based polarizer dye with iodine and/or a dichroic dye and a protective film provided on at least one surface of the polyvinyl alcohol-based polarizer, a depolarized area with single body transmittance of 80% or greater in a wavelength band of 400 nm to 800 nm, and the depolarized area has arithmetic mean roughness (Ra) of 200 nm or less, a polarization degree of 10% or less and sagging of 10 μm or less.

Herein, types of the liquid crystal panel included in the liquid crystal display device are not particularly limited. For example, passive matrix-type panels such as a twisted nematic (TN)-type, a super twisted nematic (STN)-type, a ferroelectric (F)-type or a polymer dispersed (PD)-type; active matrix-type panels such as a two terminal-type or a three terminal-type; in plane switching (IPS)-type panels and vertical alignment (VA)-type panels may be included, however, the liquid crystal panel is not limited thereto. In addition, types of other constitutions forming the liquid crystal display device such as upper and lower substrates (for example, color filter substrate or array substrate) are not particularly limited as well.

One embodiment of the present specification provides a photocurable composition for a polarizing plate protective layer comprising a photopolymerizable compound formed with a first epoxy-based compound, a second epoxy-based compound and an oxetane compound; and a photocation polymerization initiator, wherein the first epoxy-based compound is included in 50 parts by weight to 80 parts by weight with respect to a total 100 parts by weight of the photopolymerizable compound, the photocation polymerization initiator comprises a short wavelength initiator and a long wavelength initiator, and the short wavelength initiator is included in 2 parts by weight to 2.5 parts by weight and the long wavelength initiator is included in 0.8 parts by weight to 1.5 parts by weight with respect to a total 100 parts by weight of the photocurable composition for a polarizing plate protective layer.

Descriptions on the first epoxy-based compound, the second epoxy-based compound, the oxetane compound and the photocation polymerization initiator are the same as the descriptions provided above.

Hereinafter, the present specification will be described in detail with reference to examples in order to specifically describe the present specification. However, examples according to the present specification may be modified to various other forms, and the scope of the present specification may not be construed as being limited to the examples described below. The examples of the present specification are provided in order to more fully describe the present specification to those having average knowledge in the art.

<Experimental Example>—Preparation of Photocurable Composition for Polarizing Plate Protective Layer <Experimental Example 1>—Preparation of Photocurable Composition 1

Photocurable Composition 1 was prepared using 65 parts by weight of 3,4-epoxycyclohexylmethyl-3',4'-epoxycyclohexane carboxylate (product name Celloxide-2021P), 15 parts by weight of 3-ethyl-3-[(3-ethyloxetan-3-yl)methoxymethyl]oxetane (TOAGOSEI Co., Ltd. ARON OXETANE OXT-221) and 20 parts by weight of 1,4-cyclohexyl dimethanol diglycidyl ether (CHDMDGE), and adding 2.11 parts by weight of IRGACURE 250 as a short wavelength initiator and 0.84 parts by weight of ESACURE ITX as a long wavelength initiator thereto.

<Experimental Example 2>—Preparation of Photocurable Composition 2

Photocurable Composition 2 was prepared using 65 parts by weight of 3,4-epoxycyclohexylmethyl-3',4'-epoxycyclohexane carboxylate (product name Celloxide-2021P), 15 parts by weight of 3-ethyl-3-[(3-ethyloxetan-3-yl) methoxymethyl]oxetane (TOAGOSEI Co., Ltd. ARON OXETANE OXT-221) and 20 parts by weight of 1,4-cyclohexyl dimethanol diglycidyl ether (CHDMDGE), and adding 2 parts by weight of IRGACURE 250 as a short wavelength initiator and 0.79 parts by weight of ESACURE ITX as a long wavelength initiator thereto.

<Experimental Example 3>—Preparation of Photocurable Composition 3

Photocurable Composition 3 was prepared using 65 parts by weight of 3,4-epoxycyclohexylmethyl-3',4'-epoxycyclohexane carboxylate (product name Celloxide-2021P), 15 parts by weight of 3-ethyl-3-[(3-ethyloxetan-3-yl) methoxymethyl]oxetane (TOAGOSEI Co., Ltd. ARON OXETANE OXT-221) and 20 parts by weight of 1,4-cyclohexyl dimethanol diglycidyl ether (CHDMDGE), and adding 2.64 parts by weight of IRGACURE 250 as a short wavelength initiator and 1.05 parts by weight of ESACURE ITX as a long wavelength initiator thereto.

<Experimental Example 4>—Preparation of Photocurable Composition 4

Photocurable Composition 4 was prepared using 65 parts by weight of 3,4-epoxycyclohexylmethyl-3',4'-epoxycyclohexane carboxylate (product name Celloxide-2021P), 15 parts by weight of 3-ethyl-3-[(3-ethyloxetan-3-yl) methoxymethyl]oxetane (TOAGOSEI Co., Ltd. ARON OXETANE OXT-221) and 20 parts by weight of 1,4-cyclohexyl dimethanol diglycidyl ether (CHDMDGE), and adding 1.85 parts by weight of IRGACURE 250 as a short wavelength initiator and 0.74 parts by weight of ESACURE ITX as a long wavelength initiator thereto.

<Experimental Example 5>—Preparation of Photocurable Composition 5

Photocurable Composition 5 was prepared using 65 parts by weight of 3,4-epoxycyclohexylmethyl-3',4'-epoxycyclohexane carboxylate (product name Celloxide-2021P), 15 parts by weight of 3-ethyl-3-[(3-ethyloxetan-3-yl) methoxymethyl]oxetane (TOAGOSEI Co., Ltd. ARON OXETANE OXT-221) and 20 parts by weight of 1,4-cyclohexyl dimethanol diglycidyl ether (CHDMDGE), and adding 1.72 parts by weight of IRGACURE 250 as a short wavelength initiator and 0.68 parts by weight of ESACURE ITX as a long wavelength initiator thereto.

<Experimental Example 6>—Preparation of Photocurable Composition 6

Photocurable Composition 6 was prepared using 65 parts by weight of 3,4-epoxycyclohexylmethyl-3',4'-epoxycyclohexane carboxylate (product name Celloxide-2021P), 15 parts by weight of 3-ethyl-3-[(3-ethyloxetan-3-yl) methoxymethyl]oxetane (TOAGOSEI Co., Ltd. ARON OXETANE OXT-221) and 1,4-cyclohexyl dimethanol diglycidyl ether (CHDMDGE), and adding 1.58 parts by weight of IRGACURE 250 as a short wavelength initiator and 0.63 parts by weight of ESACURE ITX as a long wavelength initiator thereto.

The content of the short wavelength initiator and the content of the long wavelength initiator in each of Photocurable Compositions 1 to 6 are shown in the following Table 1.

TABLE 1

| Composition | Content of Short Wavelength Initiator | Content of Long Wavelength Initiator |
| --- | --- | --- |
| Photocurable Composition 1 | 2.11 parts by weight | 0.84 parts by weight |
| Photocurable Composition 2 | 2 parts by weight | 0.79 parts by weight |
| Photocurable Composition 3 | 2.64 parts by weight | 1.05 parts by weight |
| Photocurable Composition 4 | 1.85 parts by weight | 0.74 parts by weight |
| Photocurable Composition 5 | 1.72 parts by weight | 0.68 parts by weight |
| Photocurable Composition 6 | 1.58 parts by weight | 0.63 parts by weight |

<Experimental Example 7>—Preparation of Adhesive Composition A

Adhesive Composition A was prepared using 30 parts by weight of 3,4-epoxycyclohexylmethyl-3',4'-epoxycyclohexane carboxylate(product name Celloxide-2021P), 15 parts by weight of 3-ethyl-3-[(3-ethyloxetan-3-yl) methoxymethyl]oxetane (TOAGOSEI Co., Ltd. ARON OXETANE OXT-221), 45 parts by weight of 1,4-cyclohexyl dimethanol diglycidyl ether (CHDMDGE) (product name LD-204) and 10 parts by weight of nonanediol diacrylate (product name A-NOD-N), and adding 3 parts by weight of IRGACURE 250 as a short wavelength initiator and 1 parts by weight of ESACURE ITX as a long wavelength initiator thereto.

<Experimental Example 8>—Preparation of Adhesive Composition B

Adhesive Composition B was prepared using 30 parts by weight of 3,4-epoxycyclohexylmethyl-3',4'-epoxycyclohexane carboxylate(product name Celloxide-2021P), 15 parts by weight of 3-ethyl-3-[(3-ethyloxetan-3-yl) methoxymethyl]oxetane (TOAGOSEI Co., Ltd. ARON OXETANE OXT-221), 45 parts by weight of 1,4-cyclohexyl dimethanol diglycidyl ether (CHDMDGE) (product name LD-204) and 10 parts by weight of nonanediol diacrylate (product name A-NOD-N), and adding 5 parts by weight of diphenyl-(4-phenylthio)phenylsulfonium hexafluorophosphate (CPI100P, manufactured by Sanapro) as a photoinitiator thereto.

<Example 1>—Manufacture of Polarizing Plate (Protective Film/Adhesive Layer/PVA/Protective Layer)

Example 1-1

(1) Preparation of Laminate (Protective Film/Adhesive Layer/PVA)

A polarizer was prepared using a method of dyeing a polyvinyl alcohol (PVA)-based resin film with a dichroic dye, then elongating the result in a certain direction and crosslinking the result. On one surface of the prepared polarizer, Adhesive Composition A was coated using a roll coater to form an adhesive layer, and after laminating a PET film (TA-044, manufactured by Toyobo Co., Ltd.) thereon as a protective film, the polarizer and protective film were adhered to each other through curing by irradiating ultraviolet rays of 1,000 mJ/cm$^2$ using an ultraviolet irradiator. The adhesive layer had a thickness of 2 μm.

(2) Manufacture of Polarizing Plate

On a surface opposite to the protective film-laminated surface of the polarizer, Photocurable Composition 1 was coated using a bar coater or a roll coater, and a protective layer having a thickness of 6 μm was formed by irradiating ultraviolet rays of 1,000 mJ/cm² using an ultraviolet irradiator to manufacture a polarizing plate. The polarizing plate has a structure in which a protective film is laminated on one surface of a polarizer using an adhesive layer as a medium, and a protective layer is directly formed on a surface opposite to the protective film-laminated surface of the polarizer.

Comparative Examples 1-1 to 1-5

Polarizing plates were manufactured in the same manner as in Example 1-1 except that Photocurable compositions 2 to 6 were respectively used instead of Photocurable Composition 1.

Evaluation Example 1

<Evaluation Example 1-1>—Evaluation on High Temperature Facilitation (Evaluation on Rate of Crack Occurrences)

Using each of the photocurable compositions prepared in Experimental Examples 1 to 6, a laminate was prepared in the same manner as in Example 1-1. After that, a polarizing plate was manufactured in the same manner as in Examples 1-1 and Comparative Examples 1-1 to 1-5 except that cracks were induced on the polarizer by scraping with a load of 300 g using a blunt pencil.

After cutting the polarizing plate to a width of 120 mm and a length of 100 mm, the polarizing plate was left unattended for 100 hours to 300 hours at 80° C., and it was observed whether light leaked by the opening of cracks due to polarizer shrinkage. The number of cracks having light leakage among the total cracks was calculated to derive a rate of crack occurrences in the polarizing plate, and the results are shown in the following Table 2.

*Rate of crack occurrences: (number of cracks having light leakage/number of total cracks)×100 (%)

<Evaluation Example 1-2>—Evaluation on PET Blocking

Using each of the photocurable compositions prepared in Experimental Examples 1 to 6, a laminate was prepared in the same manner as in Example 1-1. After that, a polarizing plate was manufactured in the same manner as in Examples 1-1 and Comparative Examples 1-1 to 1-3 except that a carrier PET film (XD500, Toray Advanced Materials) was laminated on the protective layer of the laminate.

After aging the polarizing plate manufactured above for 5 days, an ASTM 3330 measurement method was used for the measurement using a film high speed peeler (CBT-4720, Choongbook Tech.). For the polarizing plate, the carrier PET film was peeled off at an angle of 180° and a rate of 30 m/min., and the results are shown in the following Table 2.

Depending on the appearance after 3 days passed and 9 days passed, it was divided into Lv.0 to Lv.3. The results were divided into Lv.0 to Lv.3 depending on the appearance. Lv.0 means a state in which there is no abnormality in the appearances of both of the peeled protective layer and carrier PET, Lv.1 means a state in which there is no abnormality in the appearance of the protective layer, but there are some scratched marks on the surface of the peeled carrier PET film, Lv.2 means a state in which the protective layer surface is damaged and the carrier PET film is peeled off, and Lv.3 means a state in which the carrier PET film is torn (broken) without being peeled off. Herein, in order to identify that the surface of the carrier PET film is cleanly peeled off, permeation Haze was measured through a Haze meter, and values changed compared to the initial film value were compared. Haze means cloudiness and turbidity, and a degree thereof was expressed in %.

<Evaluation Example 1-3>—Evaluation on Carrier Film Peel Strength

Each of the polarizing plates manufactured in Examples 1-1 and Comparative Examples 1-1 to 1-5 was left unattended for 7 days under a condition of a temperature of 20° C. and humidity of 50%, and cut to a width of 50 mm and a length of 200 mm. Peel strength of the protective layer for the carrier film was measured using an ASTM 3330 measurement method using a film high speed peeler (CBT-4720, Choongbook Tech.). Specifically, peel strength was measured by peeling off the carrier film from the protective layer at a rate of 30 m/min and an angle of 180°.

TABLE 2

| Category | Photocurable Composition | Evaluation on PET Blocking (After 3 Days) Lv. | Haze | Evaluation on PET Blocking (After 9 Days) Lv. | Haze (%) | Evaluation on Carrier Film Peel Strength (180° Peel off) (g/cm) | Evaluation on High Temperature Facilitation (Rate of Crack Occurrences, %) |
|---|---|---|---|---|---|---|---|
| Example 1-1 | Composition 1 | Lv. 0 | 4.05 | Lv. 1 | 6.0 | 40 | 0% |
| Comparative Example 1-4 | Composition 2 | Lv. 0 | 3.83 | Lv. 1 | 4.5 | 30 | 20% |
| Comparative Example 1-5 | Composition 3 | Lv. 3 | Broken | Lv. 3 | Broken | 180 | 0% |
| Comparative Example 1-1 | Composition 4 | Lv. 0 | 3.89 | Lv. 0 | 3.8 | 10 | 100% |
| Comparative Example 1-2 | Composition 5 | Lv. 0 | 3.8 | Lv. 0 | 4.07 | 10 | 100% |
| Comparative Example 1-3 | Composition 6 | Lv. 0 | 3.89 | Lv. 0 | 3.76 | 10 | 100% |

As shown in Table 2, it was seen that crack occurrences were prevented in Examples 1-1 using the photocurable composition for a polarizing plate protective layer of the present specification, and particularly, Example 1-1 was very effective in preventing PET blocking. Specifically, it was seen that Examples 1-1 was very effective in preventing both crack occurrences and PET blocking compared to Comparative Examples 1-1 to 1-4.

In addition, as seen from the evaluation results on the carrier film peel strength, Examples 1-1 using the photocurable composition for a polarizing plate protective layer of the present specification was effective in preventing carrier PET blocking, and it was seen that there is a difference in the working principle compared to a composition for an adhesive requiring excellent adhesive strength and adhesiveness with a protective film.

<Example 2>—Manufacture of Polarizing Plate

<Examples 2-1 to 2-3>—(Protective Film/Adhesive Layer/PVA/Protective Layer)

Polarizing plates were manufactured in the same manner as in Example 1-1 except for varying the protective layer thickness as in the following Table 3.

<Comparative Example 2-1>—(Protective Film/Adhesive Layer/PVA/Adhesive Layer/Protective Film A)

Adhesive Composition A was coated on one surface of the same polarizer as that used in Examples 2-1 to 2-3 to a thickness of 2 μm using a roll coater, and a corona treated polyethylene terephthalate film (TA-044, manufactured by Toyobo Co., Ltd.) having a thickness of 80 μm was laminated thereon. On a surface opposite to the Adhesive Composition A-coated surface of the polarizer, Adhesive Composition B was coated to a thickness of 1 μm using a roll coater, and after laminating a TAC film (manufactured by Fuji Corporation) having a thickness of 25 μm as Protective Film A, photocurable Adhesive compositions A and B were cured by irradiating ultraviolet rays to manufacture a polarizing plate.

<Comparative Example 2-2>—(Protective Film/Adhesive Layer/PVA/Adhesive Layer/Protective Film A)

A polarizing plate was manufactured in the same manner as in Comparative Example 2-1 except that an acrylic film manufactured by Riken was used as Protective Film A and Protective Film A was formed to a thickness of 40 μm.

<Comparative Example 2-3>—(Protective Film/Adhesive Layer/PVA/Adhesive Layer/Protective Film A)

A polarizing plate was manufactured in the same manner as in Comparative Example 2-1 except that an acrylic film manufactured by LGC was used as Protective Film A and Protective Film A was formed to a thickness of 40 μm.

Evaluation Example 2

<Evaluation Example 2-1>—Evaluation on High Temperature Facilitation (Evaluation on Rate of Crack Occurrences)

For each of the polarizing plates manufactured in Examples 2-1 to 2-3 and Comparative Examples 2-1 to 2-3, an evaluation on high temperature facilitation was performed. Cracks were induced on the polarizer by scraping with a load of 300 g using a blunt pencil. After that, the polarizing plate was cut to a width of 120 mm and a length of 100 mm, left unattended for 100 hours at 80° C., and it was observed whether light leaked by the opening of cracks due to polarizer shrinkage. The number of cracks having light leakage among the total cracks was calculated to derive a rate of crack occurrences in the polarizing plate, and the results are shown in the following Table 3.

*Rate of crack occurrences: number of cracks having light leakage/number of total cracks×100 (%)

<Evaluation Example 2-2>—Evaluation on Storage Modulus

Photocurable Composition 1 prepared in Experimental Example 1 and Adhesive Composition B prepared in Experimental Example 8 were each coated on a release film (polyethylene terephthalate film, RPK38-401, manufactured by Toray Advanced Materials) to a thickness of 50 μm, and after curing the result by irradiating ultraviolet rays under a condition of light intensity being 1000 mJ/cm$^2$ or greater, the release film was removed, and the specimen was cut to a width of 5.3 mm and a length of 4.5 cm using a laser. After that, storage modulus was measured using a dynamic mechanical analyzer (DMA). With a measurement mode of multi-frequency-strain, the storage modulus was measured at strain 10% and frequency 1 Hz while raising a temperature up to 160° C. from −30° C. at a temperature raising rate of 5° C. per 1 minute, and the results are shown in the following Table 3.

In addition, for each of Protective Films A used in Comparative Examples 2-1 to 2-3, storage modulus was measured using a dynamic mechanical analyzer (DMA). With a measurement mode of multi-frequency-strain, the storage modulus was measured at strain 10% and frequency 1 Hz while raising a temperature up to 160° C. from −30° C. at a temperature raising rate of 5° C. per 1 minute, and the results are shown in the following Table 3.

TABLE 3

| Category | Protective Layer Composition | Protective Layer Thickness (μm) | Storage Modulus (80° C., MPa) | Evaluation on High Temperature Facilitation (Rate of Crack Occurrences, %) |
|---|---|---|---|---|
| Example 2-1 | Protective Layer | Photocurable Composition 1 | 5 | 1950 | 20% |
| Example 2-2 | Protective Layer | Photocurable Composition 1 | 8 | 1950 | 0% |

TABLE 3-continued

| Category | | Protective Layer Composition | Protective Layer Thickness (μm) | Storage Modulus (80° C., MPa) | Evaluation on High Temperature Facilitation (Rate of Crack Occurrences, %) |
|---|---|---|---|---|---|
| Example 2-3 | Protective Layer | Photocurable Composition 1 | 10 | 1950 | 0% |
| Comparative Example 2-1 | Protective Film A | TAC Film of Fuji Corporation | 25 | 2800 | 80% |
| | Adhesive Layer | Adhesive Composition B | 1 | 700 | |
| Comparative Example 2-2 | Protective Film A | Acrylic Film of Riken | 40 | 1800 | 100% |
| | Adhesive Layer | Adhesive Composition B | 1 | 700 | |
| Comparative Example 2-3 | Protective Film A | Acrylic Film of LGC | 40 | 1900 | 100% |
| | Adhesive Layer | Adhesive Composition B | 1 | 700 | |

As shown in Table 3, it was seen that Examples 2-1 to 2-3 using the photocurable composition for a polarizing plate protective layer of the present specification had excellent storage modulus as well as being very effective in preventing crack occurrences. Specifically, it was seen that Examples 2-1 to 2-3 directly forming a protective layer on a polarizer had a lower rate of crack occurrences compared to Comparative Examples 2-1 to 2-3 forming with an adhesive layer and Protective Film A. In addition, although the thickness of Protective Film A of the polarizing plate according to Comparative Examples 2-1 to 2-3 was from 25 μm to 40 μm, which was thicker than 5 μm to 10 μm, a thickness of the protective layer of Examples 2-1 to 2-3, a number of cracks occurred decreasing durability.

In addition, the polarizing plate according to Examples 2-1 to 2-3 had a protective layer directly formed on a polarizer, and storage modulus the protective layer was high of 1,500 MPa or greater without comprising a separate protective film. Accordingly, it was seen that the protective layer according to one embodiment of the present specification effectively suppressed a shrinkage or expansion phenomenon of the polarizer at a high temperature without a separate protective film.

On the other hand, in the polarizing plate according to Comparative Examples 2-1 to 2-3, storage modulus of the adhesive layer formed on the polarizer was low even when storage modulus of Protective Film A was high. Accordingly, a shrinkage or expansion phenomenon of the polarizer at a high temperature was not able to be effectively suppressed.

Hereinbefore, preferred embodiments of the present specification have been described, however, the present disclosure is not limited thereto, and various modifications may be made within the scope of the claims and the detailed descriptions of the disclosure, and these also fall within the category of the disclosure.

The invention claimed is:
1. A polarizing plate comprising:
a polarizer; and
a protective layer in direct contact with at least one surface of the polarizer,
wherein the protective layer is a cured material of a photocurable composition for a polarizing plate protective layer comprising a photopolymerizable compound, and a photocation polymerization initiator; and
wherein the photopolymerizable compound is formed from a first epoxy-based compound, a second epoxy-based compound and an oxetane compound, where in the first epoxy-based compound is 3,4-epoxycyclohexylmethyl-3',4'-epoxycyclohexane carboxylate and the second epoxy-based compound is 1,4-cyclohexyl dimethanol diglycidyl ether, and the oxetane compound is 3-ethyl-3-[(3-ethyloxetan-3-yl)methoxymethyl]oxetane;
the first epoxy-based compound is included in 65 parts by weight with respect to a total 100 parts by weight of the photopolymerizable compound wherein the second epoxy-based compound is included in 20 parts by weight with respect to a total 100 parts by weight of the photopolymerizable compound, and the oxetane compound is included in 15 parts by weight of the photopolymerizable compound;
the photocation polymerization initiator comprises a short wavelength initiator and a long wavelength initiator;
the short wavelength initiator is (4-methylphenyl) [4-(2-methylpropyl)phenyl] iodonium hexafluorophosphate and is included in 2.1 parts by weight and the long wavelength initiator is isopropylthioxanthone and is included in 0.8 parts by weight with respect to a total 100 parts by weight of the photocurable composition for a polarizing plate protective layer;
the photocurable composition for a polarizing plate protective layer has viscosity of greater than or equal to 50 cps and less than or equal to 200 cps at 25° C.; and
the protective layer has storage modulus of 1,500 MPa to 10,000 MPa at 80° C.
2. The polarizing plate of claim 1, wherein the protective layer is formed on the polarizer by direct coating.
3. The polarizing plate of claim 1, wherein the protective layer has a thickness of 5 μm to 10 μm.
4. The polarizing plate of claim 1, further comprising a carrier film on a surface opposite to a surface in contact with the polarizer of the protective layer.
5. The polarizing plate of claim 1, wherein a protective film is attached on a surface opposite to a surface in contact with the protective layer of the polarizer using an adhesive layer as a medium.

6. The polarizing plate of claim 5, wherein the adhesive layer is a cured material of an adhesive composition, and the adhesive composition comprises an epoxy compound and an oxetane compound.

7. An image display device comprising the polarizing plate of claim 1.

8. A photocurable composition for a polarizing plate protective layer comprising:
   a photopolymerizable compound formed with a first epoxy-based compound, a second epoxy-based compound and an oxetane compound, where in the first epoxy-based compound is 3,4-epoxycyclohexylmethyl-3',4'-epoxycyclohexane carboxylate and the second epoxy-based compound is 1,4-cyclohexyl dimethanol diglycidyl ether, and the oxetane compound is 3-ethyl-3-[(3-ethyloxetan-3-yl)methoxymethyl]oxetane; and
   a photocation polymerization initiator,
   wherein the first epoxy-based compound is included in 65 parts by weight with respect to a total 100 parts by weight of the photopolymerizable compound, wherein the second epoxy-based compound is included in 20 parts by weight with respect to a total 100 parts by weight of the photopolymerizable compound, and the oxetane compound is included in 15 parts by weight of the photopolymerizable compound;
   the photocation polymerization initiator comprises a short wavelength initiator and a long wavelength initiator; and
   the short wavelength initiator is (4-methylphenyl) [4-(2-methylpropyl)phenyl] iodonium hexafluorophosphate and is included in 2.1 parts by weight and the long wavelength initiator is isopropylthioxanthone and is included in 0.8 parts by weight with respect to a total 100 parts by weight of the photocurable composition for a polarizing plate protective layer;
   the photocurable composition for a polarizing plate protective layer has viscosity of greater than or equal to 50 cps and less than or equal to 200 cps at 25° C.; and
   the protective layer has storage modulus of 1,500 MPa to 10,000 MPa at 80° C.

* * * * *